(12) United States Patent
Houle

(10) Patent No.: US 7,114,514 B2
(45) Date of Patent: Oct. 3, 2006

(54) WATER MANAGEMENT AND LEAK DETECTION FOR HOT WATER TANK

(76) Inventor: Andre Houle, 1461, Chemin Principal, St-Gerard (CA) G9R 1E6

(*) Notice: Subject to any disclaimer, the term of this patent is extended or adjusted under 35 U.S.C. 154(b) by 560 days.

(21) Appl. No.: 10/660,163

(22) Filed: Sep. 12, 2003

(65) Prior Publication Data

US 2006/0169321 A1 Aug. 3, 2006

Related U.S. Application Data

(60) Provisional application No. 60/459,956, filed on Apr. 4, 2003.

(51) Int. Cl.
*E03B 1/00* (2006.01)
(52) U.S. Cl. .................. 137/312; 220/571; 222/108
(58) Field of Classification Search ................ 137/312; 220/571; 222/108
See application file for complete search history.

(56) References Cited

U.S. PATENT DOCUMENTS

| | | | |
|---|---|---|---|
| 3,920,031 A | 11/1975 | Maxfield | |
| 4,324,268 A | 4/1982 | Jacobson | |
| 4,909,274 A * | 3/1990 | Rodriguez | 137/312 |
| 4,944,253 A * | 7/1990 | Bellofatto | 137/312 |
| 5,240,022 A | 8/1993 | Franklin | |
| 5,334,973 A | 8/1994 | Furr | |
| 5,345,224 A * | 9/1994 | Brown | 340/605 |
| 5,441,070 A | 8/1995 | Thompson | |
| 5,844,492 A | 12/1998 | Buffin | |
| 5,870,024 A * | 2/1999 | Arvelo, Jr. | 340/605 |
| 6,057,770 A | 5/2000 | Justesen | |
| 6,186,162 B1 | 2/2001 | Purvis | |
| 6,489,895 B1 | 12/2002 | Apelman | |
| 6,543,471 B1* | 4/2003 | Carroll | 137/312 |
| 6,997,207 B1* | 2/2006 | McKesson | 137/312 |

FOREIGN PATENT DOCUMENTS

| JP | 8 16 90 60 A | 7/1996 |
|---|---|---|
| JP | 10 23 09 97 A | 9/1998 |

* cited by examiner

*Primary Examiner*—Kevin Lee
(74) *Attorney, Agent, or Firm*—ROBIC; Gonzalo Lavin

(57) ABSTRACT

A water management and leak detection has a containment system to contain hot water tank leaks and and electrical circuits that manage water flow and electricity to the hot water tank.

1 Claim, 17 Drawing Sheets

WATER MANAGEMENT AND LEAK DETECTION FOR HOT WATER TANK

This application claims priority based on provisional application 60/459,956 filed Apr. 04, 2003

BACKGROUND OF THE INVENTION

1. Field of the Invention

This invention relates generally to alarm systems but more particularly to alarm warning against leakage of a water tank.

2. Background

Hot water tanks have a certain life expectancy and although most people appreciate a good hot shower, they tend to forget that it comes from a hot water tank since that object is generally hidden in the basement or deep into some closet or locker, out of sight out of mind—that is until they find themselves knee deep in water.

In apartment dwellings or multiple unit condos, a lot of damage can result from a hot water tank leak with water leaking down one or more storeys. For this reason, a number of inventions have dealt with this potential problem. Since leaks generally occur on the inner section and that water is usually stopped by the layer of insulation and then the outer sheet of metal, water essentially seeps out from the bottom and the prior art teaches the use of a shallow container placed underneath the tank to receive leaked water. Optionally, a pump such as a ship bail pump can be used to pump the water from that shallow container into a drain.

A number of other inventions teach various electromechanical means to detect a water leak, shut down electrical power to the water tank should a leak be detected and of course, shut down a main valve so that water intake is stopped thus limiting the amount of water that will leak.

More elaborate inventions provide total management of water and leak or any damage in the water line. There is even some remote controlled leak detection and flood prevention systems.

With the evolution of microelectronics and electromechanical devices, it is relatively easy to build a complete water management system using of the shelf components but there is still room for a practical means of containing the water that has already leaked and may continue to leak even after teh water valve is shut simply because a tank holds a lot of water.

SUMMARY OF THE INVENTION

It is a first object of this invention to provide for a safety system which alerts of a leak in a hot water tank.

It is a second object of this invention to provide for a safety system which eliminates potential water damage caused by a leaky hot water tank, even a severely damaged tank having extensive water leakage.

It is a third object of this invention to provide for a system that manages the water leak problem.

It is a final object of this invention to provide a system of management for hot water tank accessible by remote control.

In order to do so, the present invention consists of a containment system that can come in more than one embodiment: A rigid secondary container that covers the tank practically entirely, a soft secondary container resembling a plastic bag, a rigid modular containment system is also disclosed. There is also a hybrid embodiment, that of a shallow rigid basin placed underneath the tank with a soft shower curtain type soft layer loosely surrounding the tank.

All embodiments have water sensors or a float to sound off an alarm which can be independent or part of an overall security system. There is also a battery powered bilge pump that can operate even under a power outage. Moreover a variety of electrical circuits offer many options to handle water management which goes beyond the mere intake shutoff to the tank, the electrical circuits also handle the sensors and the alarm. A remote control can access remotely the water intake valve as well as the fuel line, for gas or oil tanks or the power for electric tanks in order to shut off the tank to save on utility bills when away on vacation or even on a daily basis to schedule stops and starts according to planned needs like showers, dishwasher, clothes washing, etc. Motion detectors can detect when someone walks into a room to use the water so that the water shutoff valve can be opened. All within the scope and spirit of this invention, a variety of permutations, added functionalities and backup or redundant systems can be combined into various electrical circuits performing water management.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
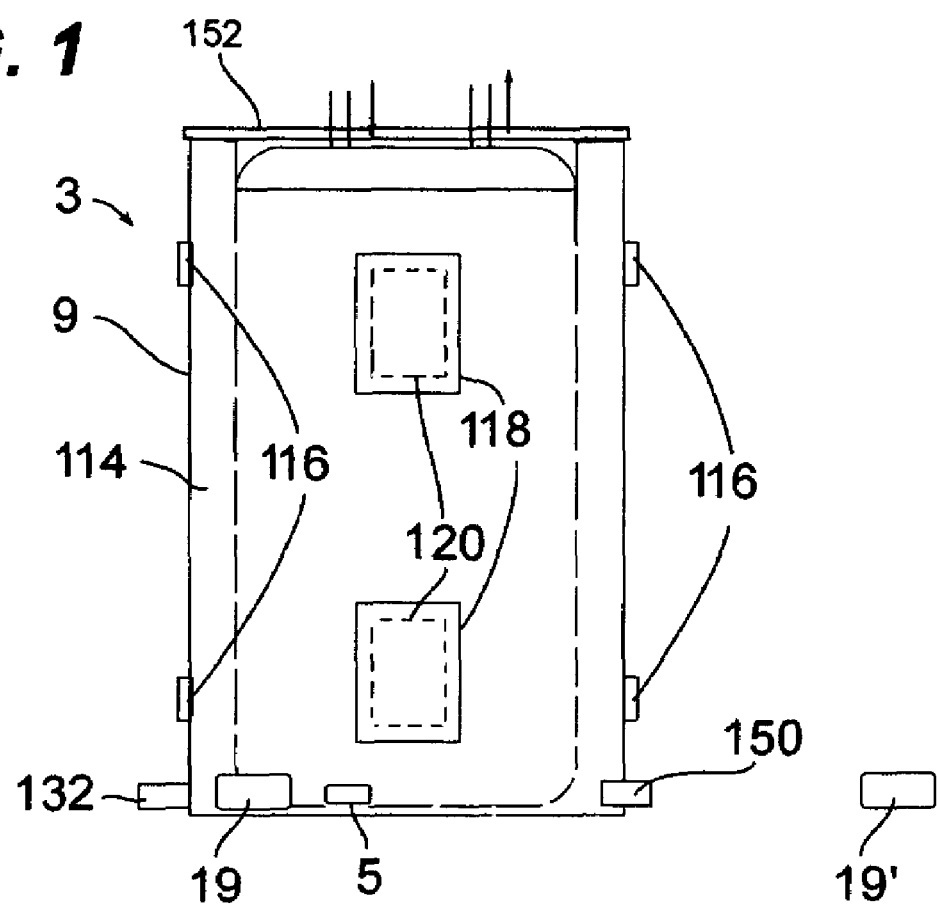
FIG. 1 Side elevation of a water tank jacketed by a rigid secondary container.

FIG. 1 A water tank (3) is enclosed inside a rigid secondary container (9) which consists of two halves (114) sealingly mated together around the water tank (3). Attachment means (116) attach the two halves together (114). Access hatches (118) can be made into the secondary container (9) to more easily access the panels (120) covering the heating elements usually found on electric hot water tanks. For gas or oil tanks; a removable panel at the bottom of the tank takes care of the access to the burner. Since each type of tanks—electric, gas, oil—has it's own set of standards as to their parts location, there is no need for too many different types of rigid secondary containers (9). A bilge pump (19) and water sensors or float (5) are placed at appropriate locations, usually at or near floor level. A drain (132) evacuates water being pumped by the bilge pump (19). In the event of a flood, a check valve (150) can receive water from outside of the secondary container (9) into the second container (9) where the float (5) can detect incoming water and start the bilge pump (19). Optionally, a secondary bilge pump (19') can be situated anywhere on the floor such as a basement floor to detect a flood. The rigid secondary container (9) can optionally be capped by a lid (152).

Figure 2:
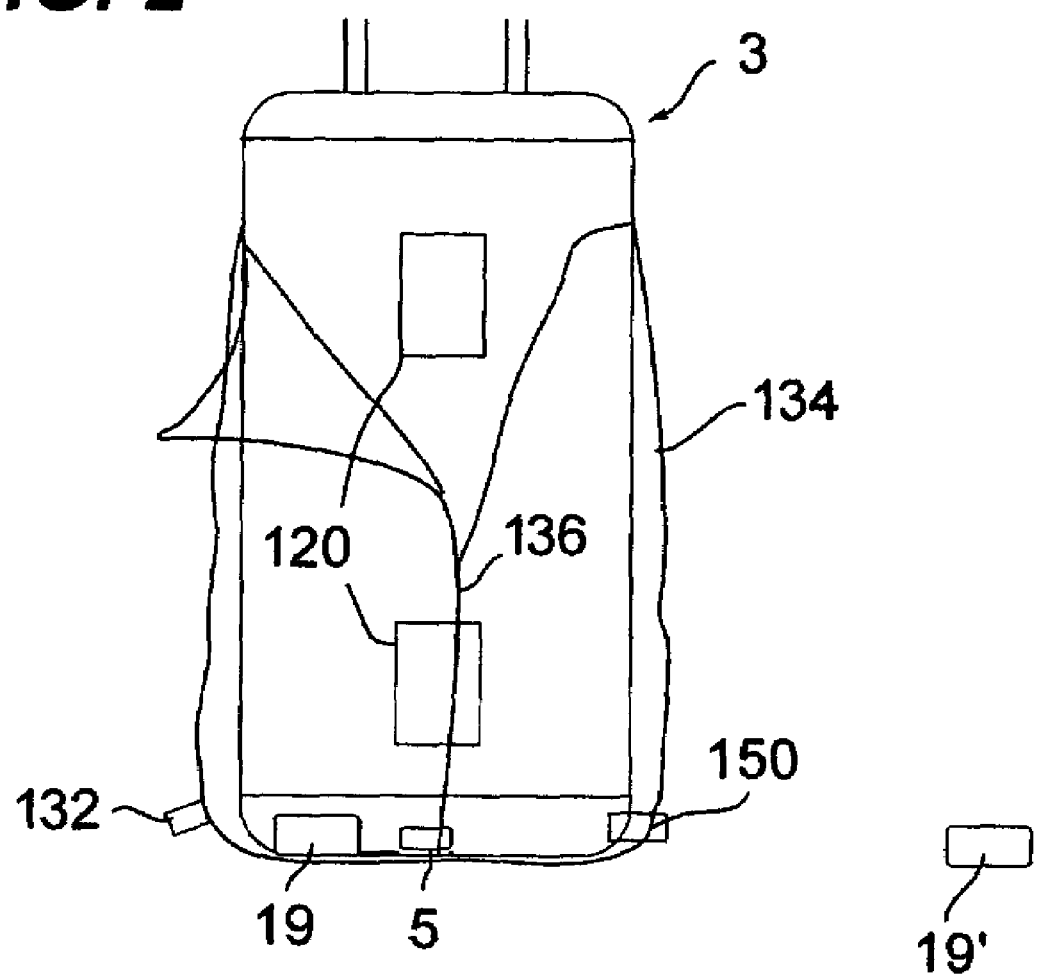
FIG. 2 Side elevation of a water tank jacketed by a soft secondary container.

FIG. 2 A soft secondary container (134) operates much like the rigid secondary container (9) except that it is easier to remove in order to access the panels (120) or burner of the tank. The front opens by way of a non metallic zipper (136) that is sealing—much like zippers found on some sandwich bags. The rest of the components are as in FIG. 1.

Figure 3:
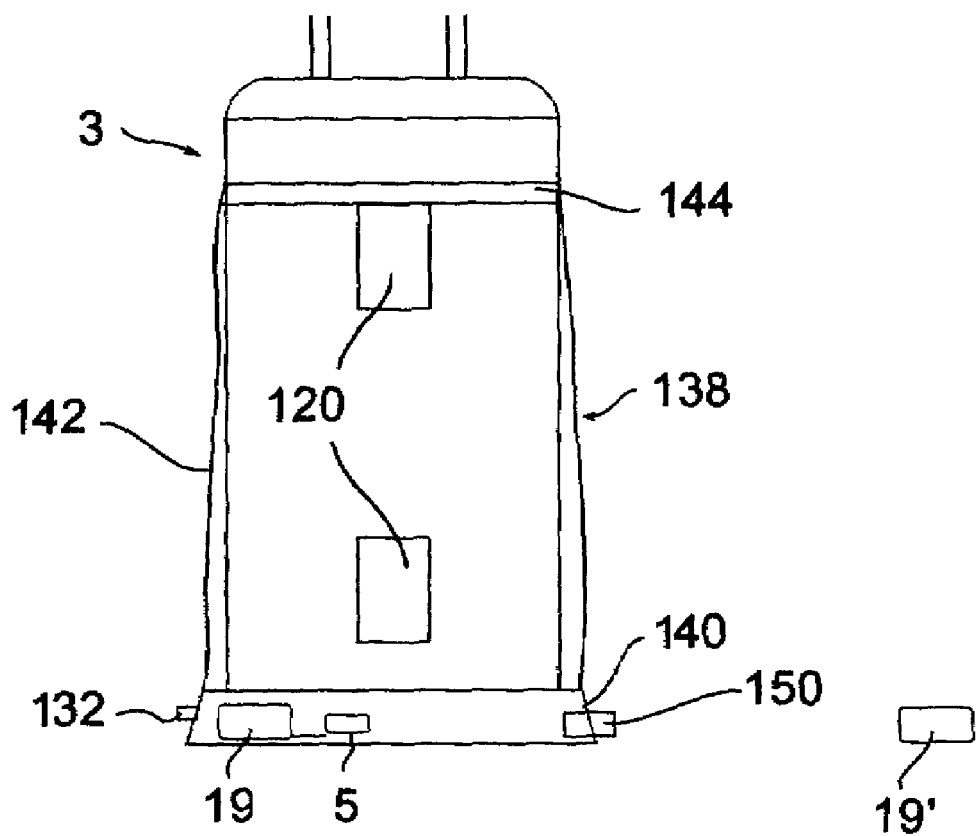
FIG. 3 Side elevation of a water tank jacketed by a hybrid secondary container.

FIG. 3 A hybrid secondary container (138) operates much like the rigid secondary container (9) or the soft secondary container (134). It has a rigid bottom basin (140) and a skirt (142) extending upwardly therefrom with a tightening belt (144) at the top. By loosening the belt (144), the skirt (142) drops and exposes the panels (120). The rest of the components are as in FIG. 1. The non metallic zipper (136) of the soft secondary container (134) can be found on this hybrid secondary container (138) in lieu of the belt (144) as the belt (144) can be found on the soft secondary container (134), these features being interchangeable since both the soft secondary container (134) and the hybrid secondary container (138) are essentially the same except for the rigid bottom basin (140) found on the hybrid secondary container (138).

Figure 4:
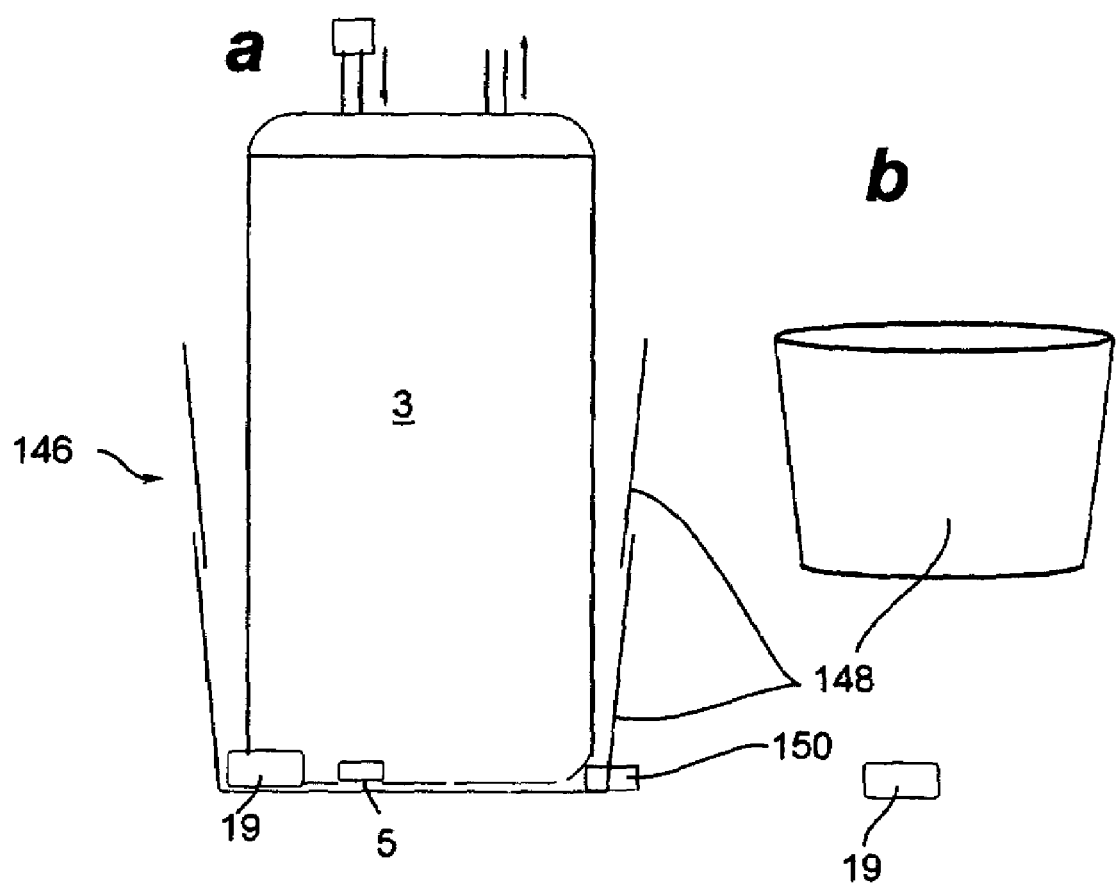
FIG. 4a Side elevation of an alternate rigid secondary container having modular coinical sections.
FIG. 4b Orthogonal view of a conical module.

FIG. 4a A modular rigid container (146) provides a plurality of slightly conical modules (148) (FIG. 4b) shaped so as to sealably wedge into one another to create a sealed modular rigid container which can be capped with a lid (152) (not shown) much like the rigid container (9) of FIG. 1. Of course, this embodiment has all the features of the other embodiments and each of these embodiments can have any of the circuit configurations discussed next.

Figure 5:
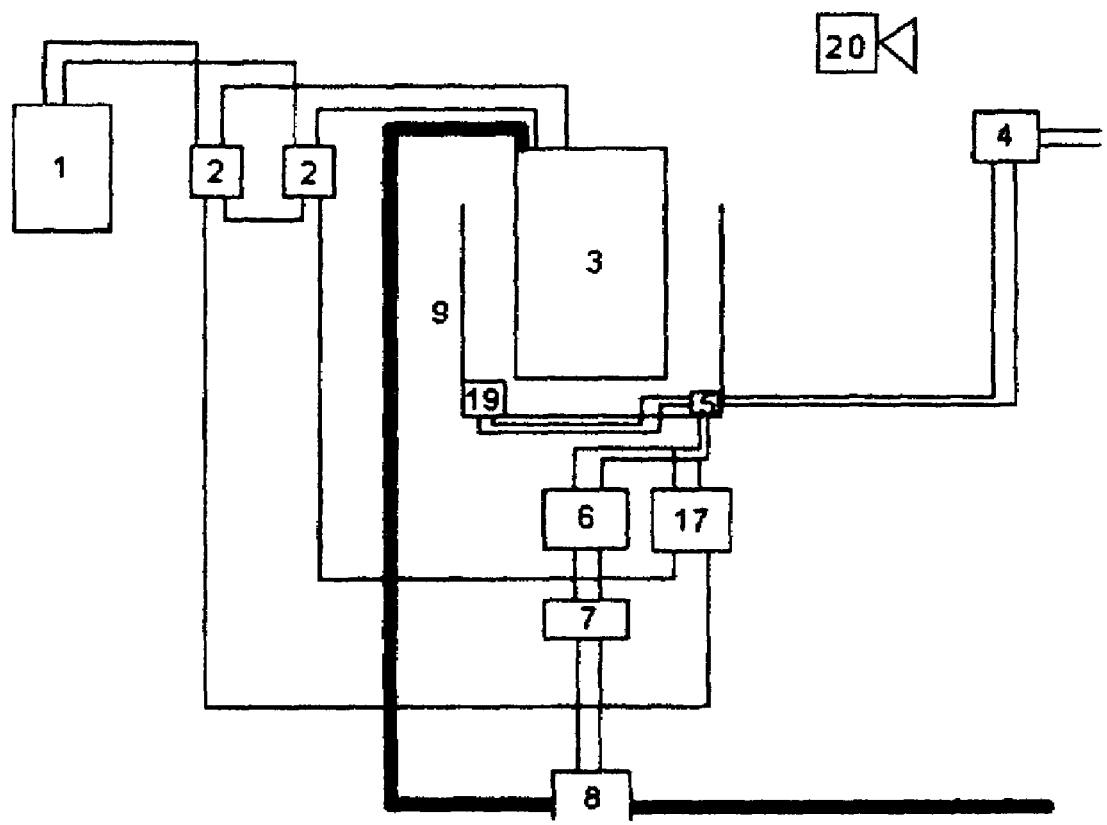
FIGS. 5–17 Diagrams of various electrical circuits.
Figure 6:
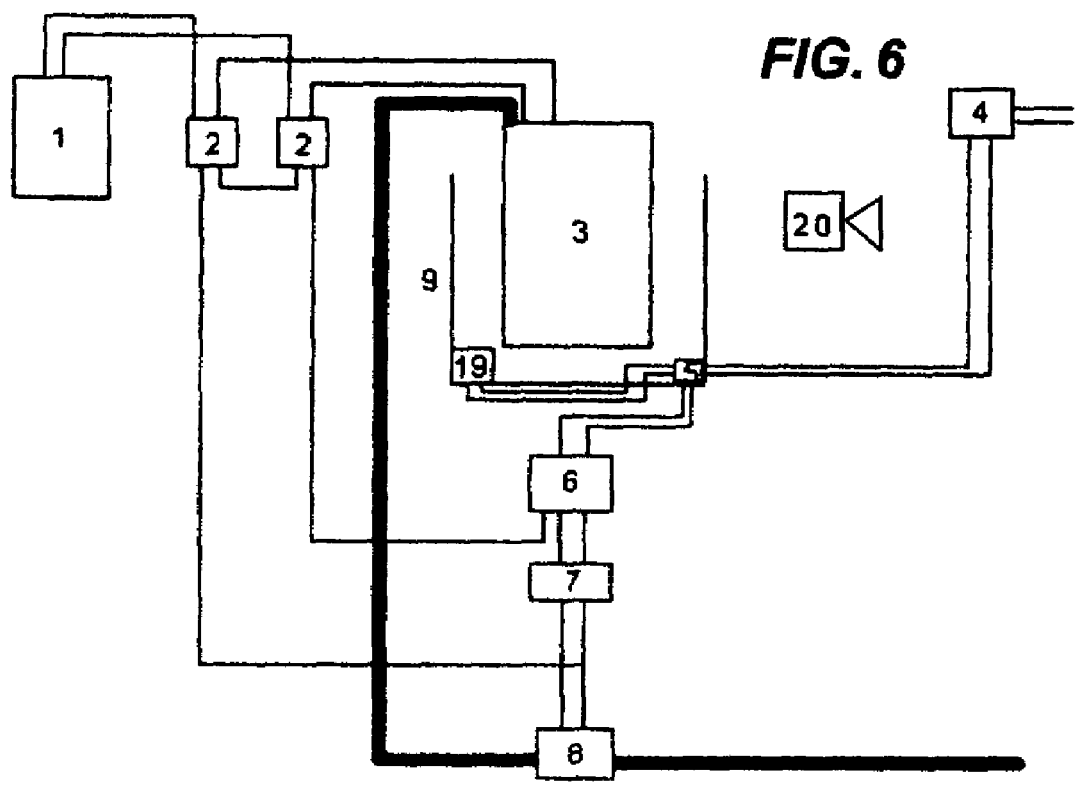
Figure 7:
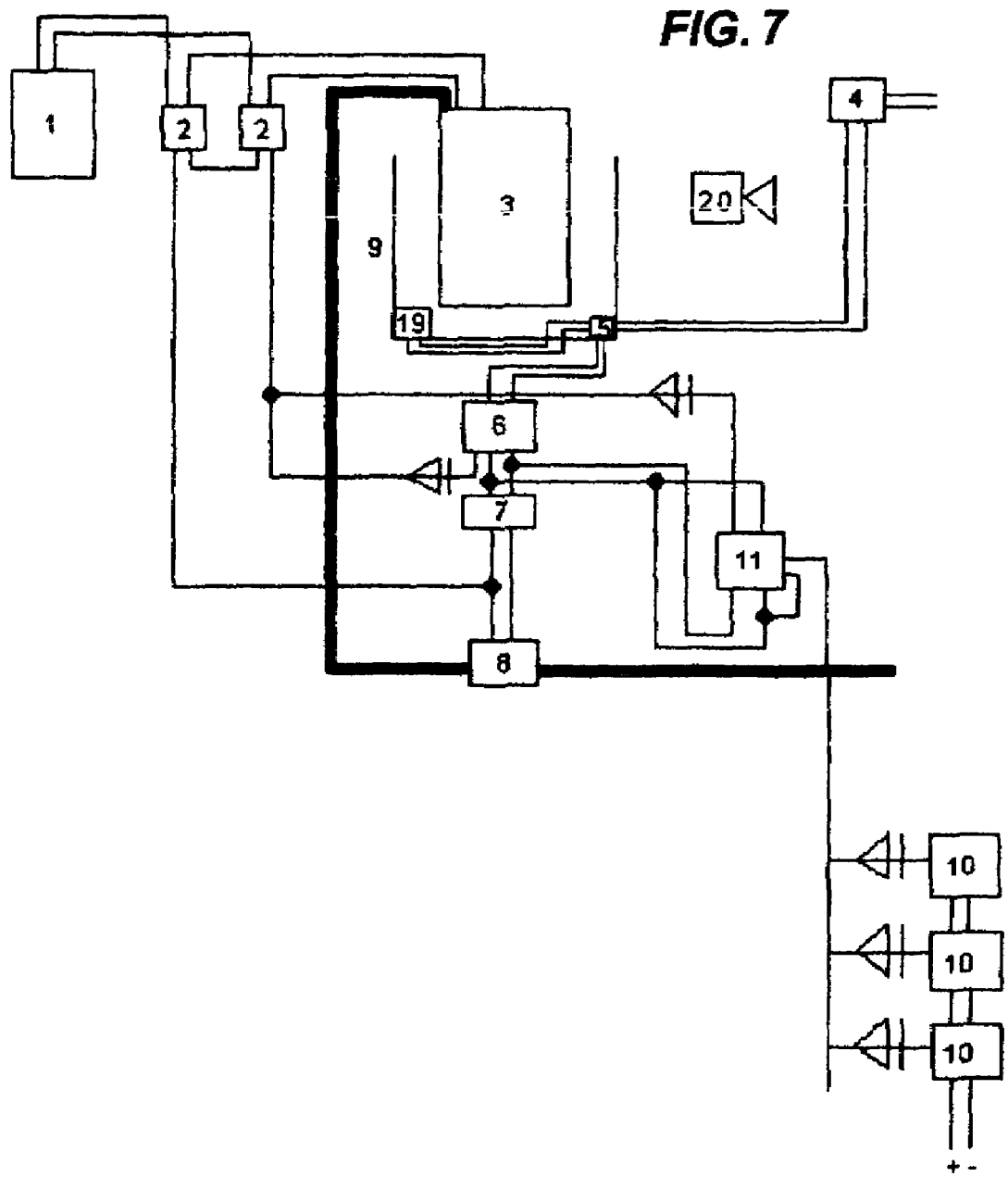
Figure 8:
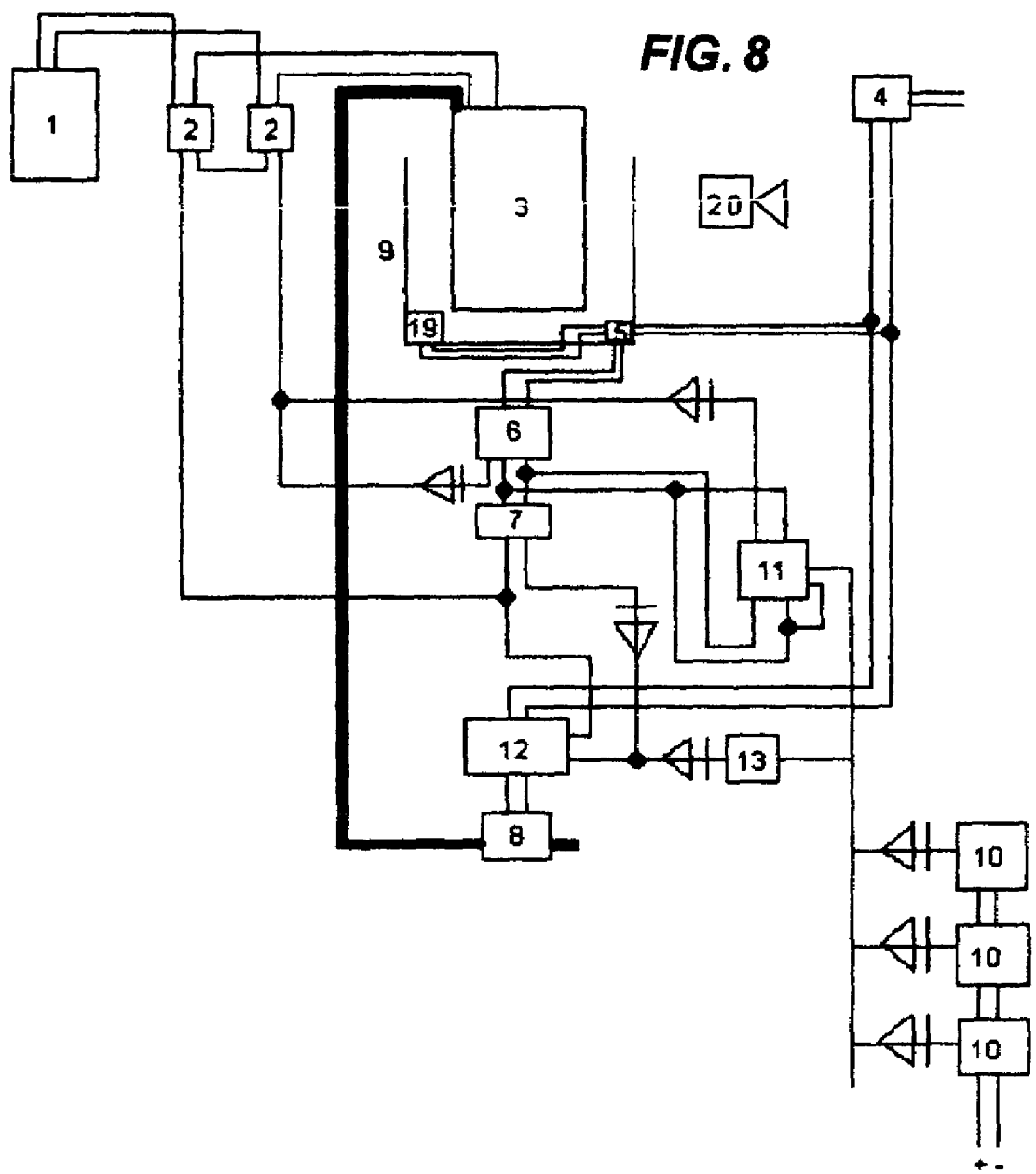
Figure 9:
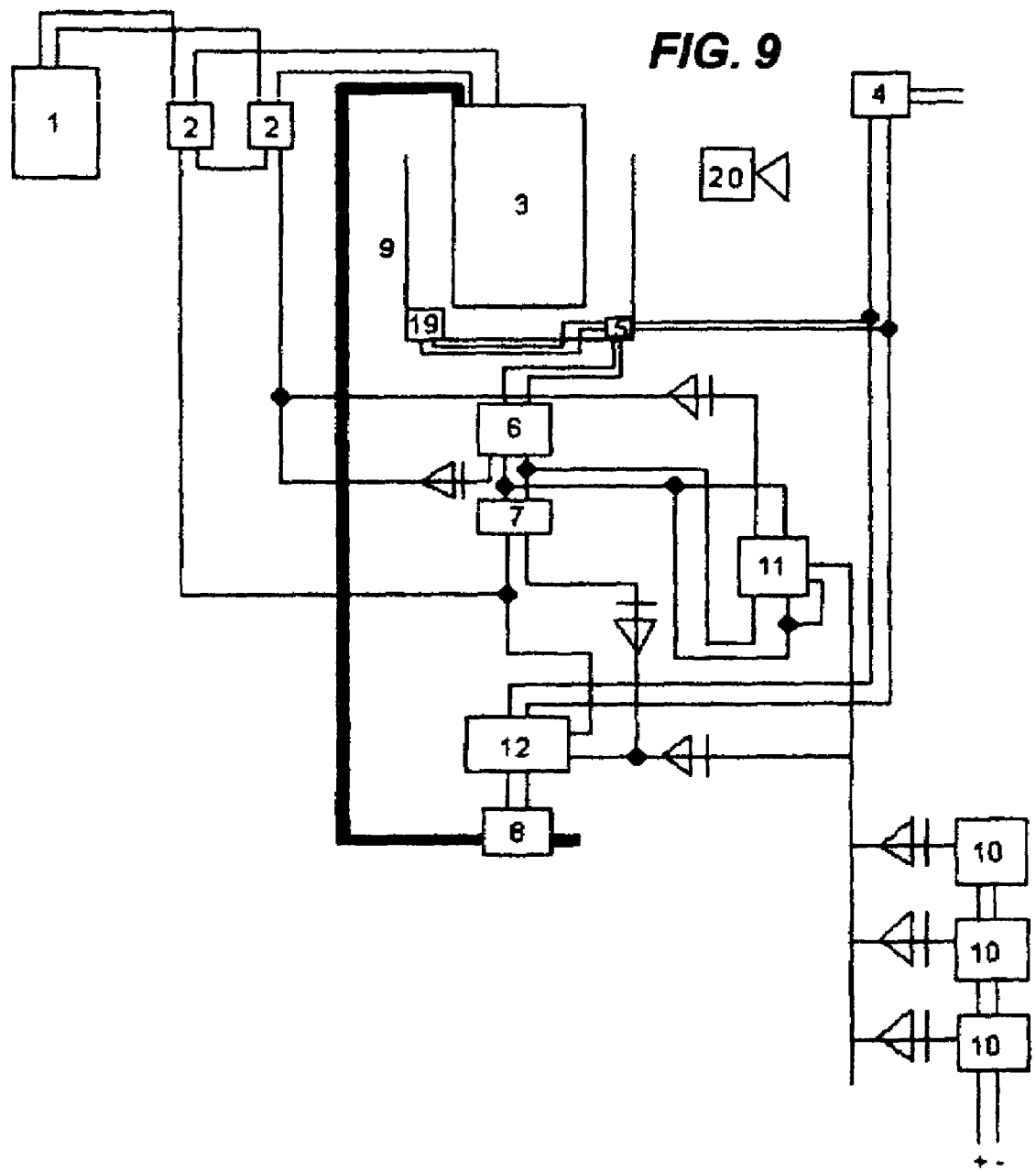
Figure 10:
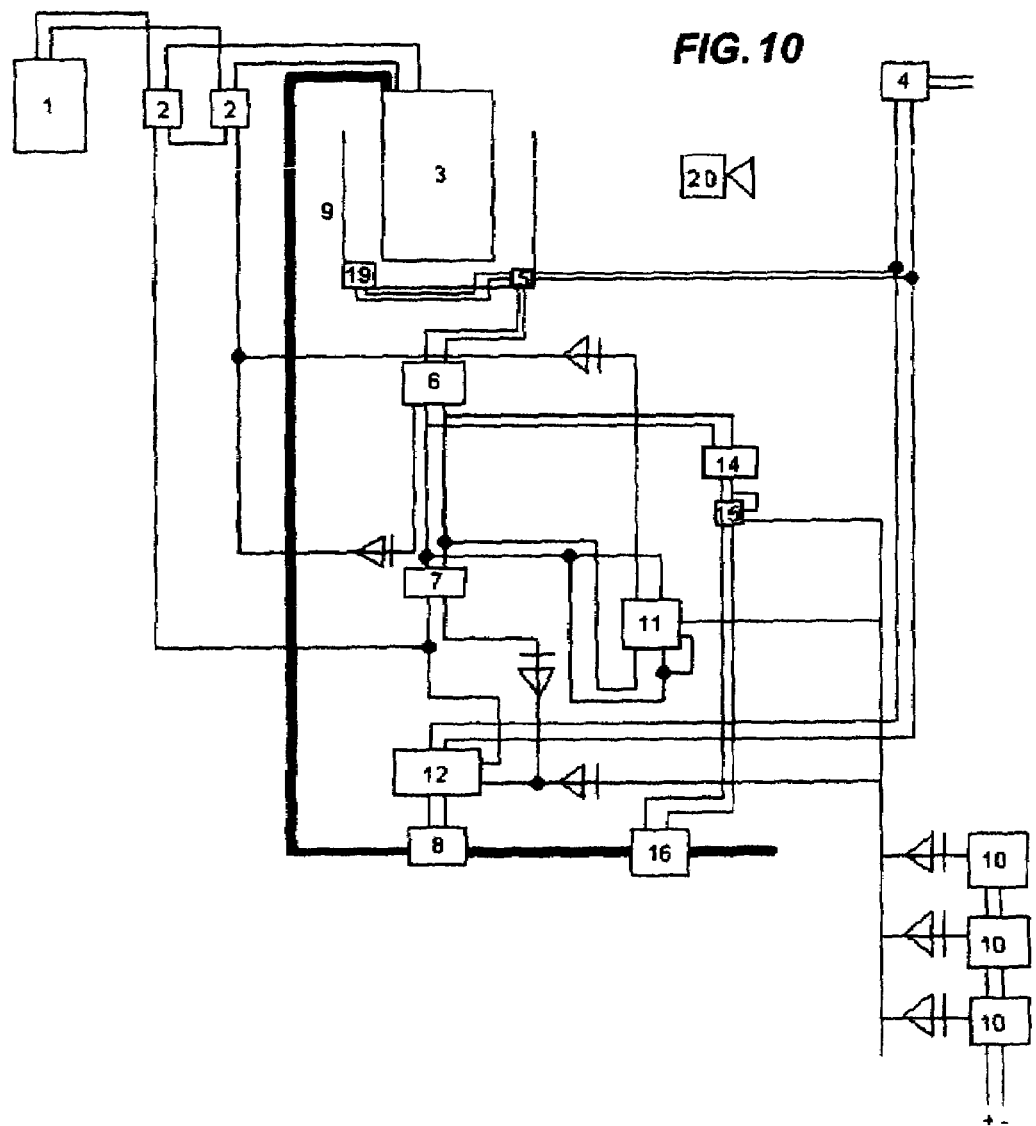
Figure 11:
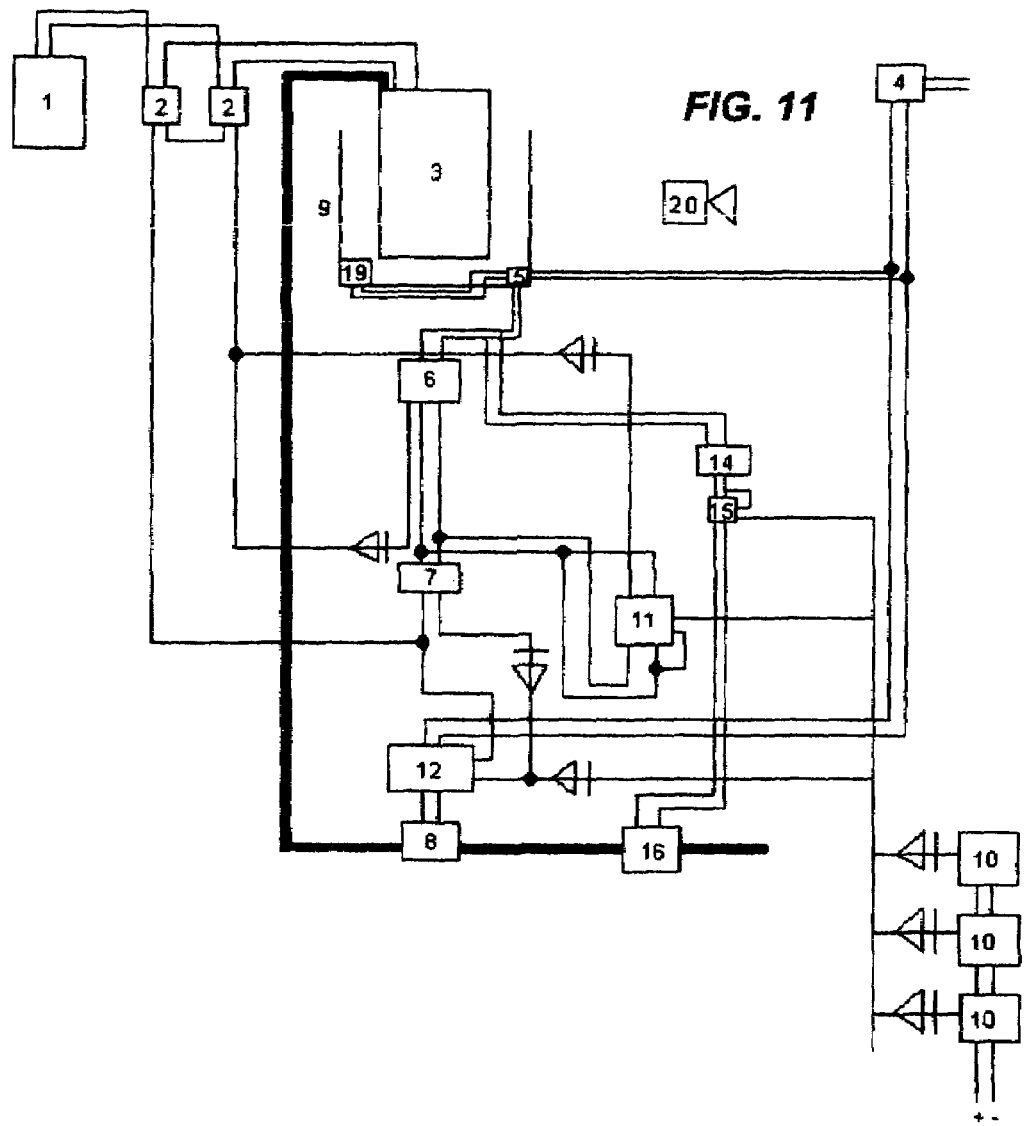
Figure 12:
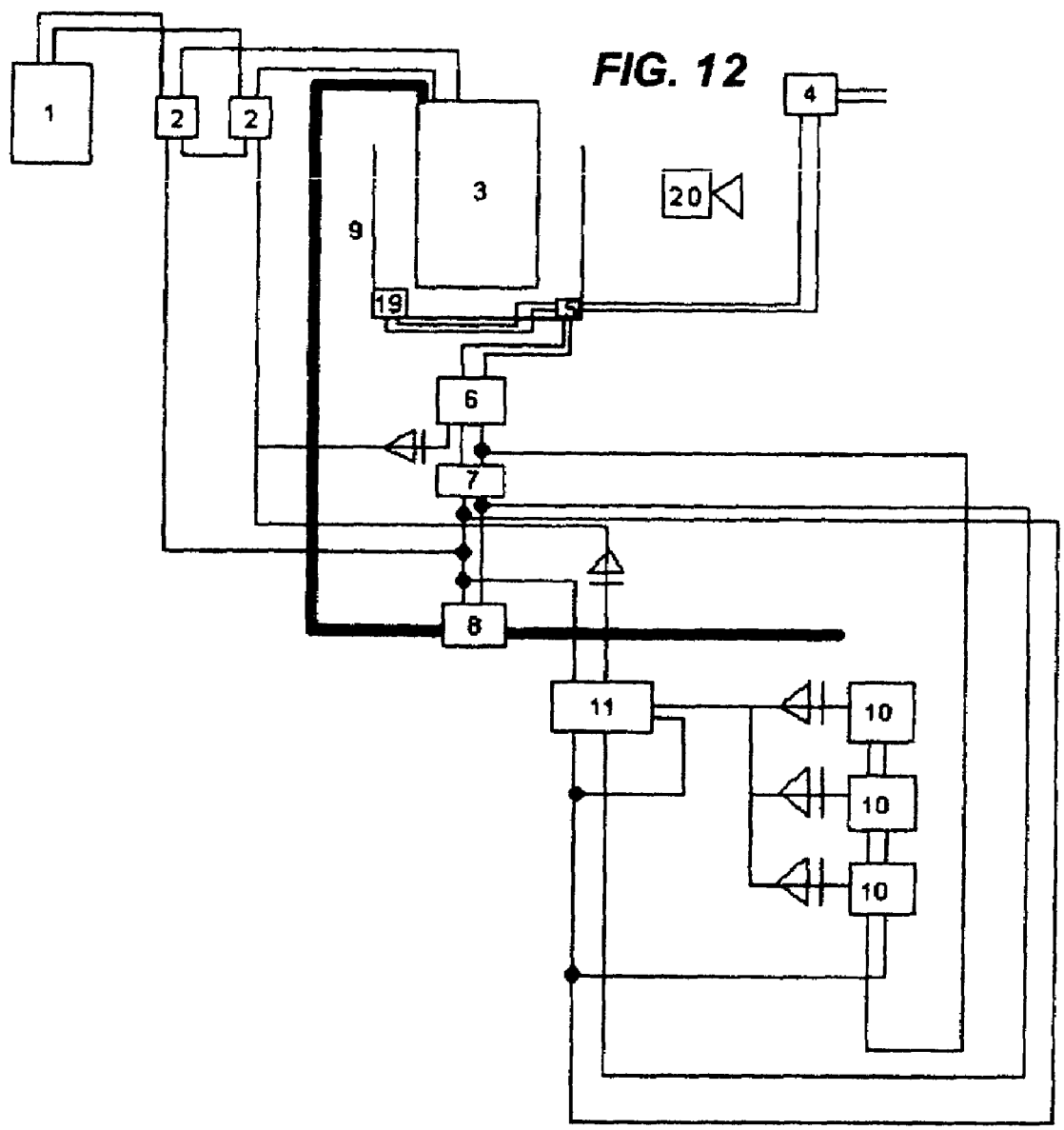
Figure 13:
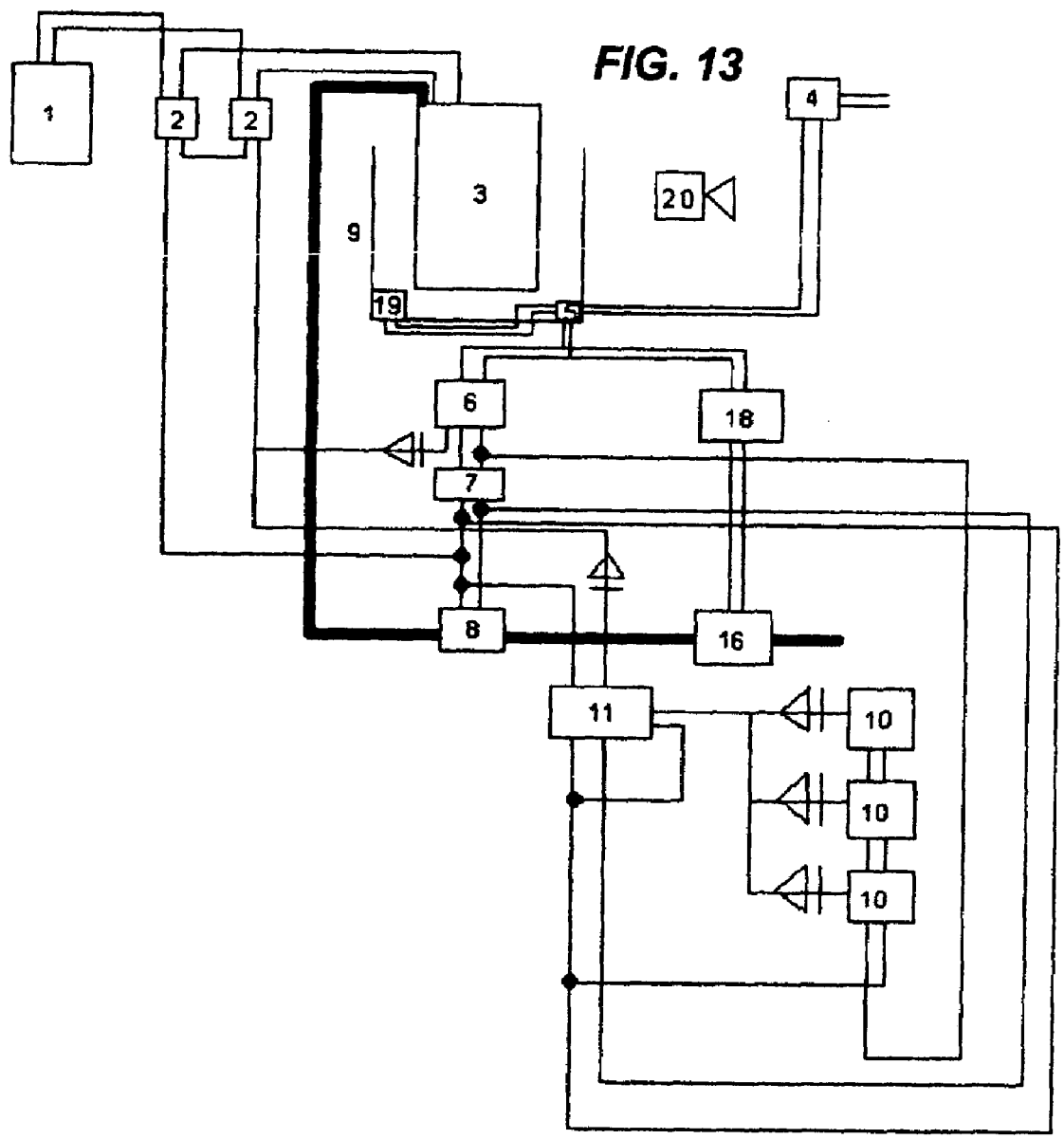
Figure 14:
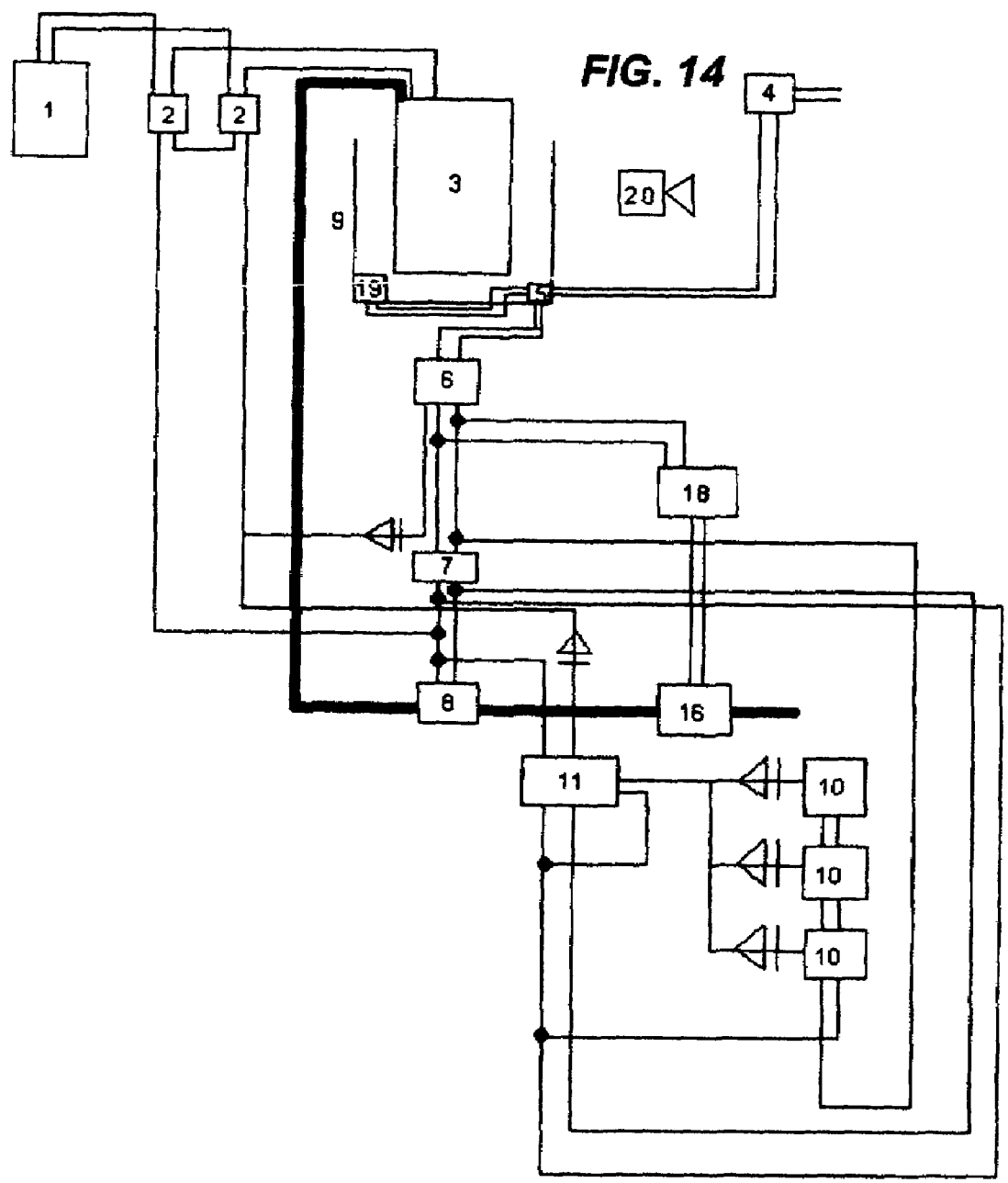
Figure 15:
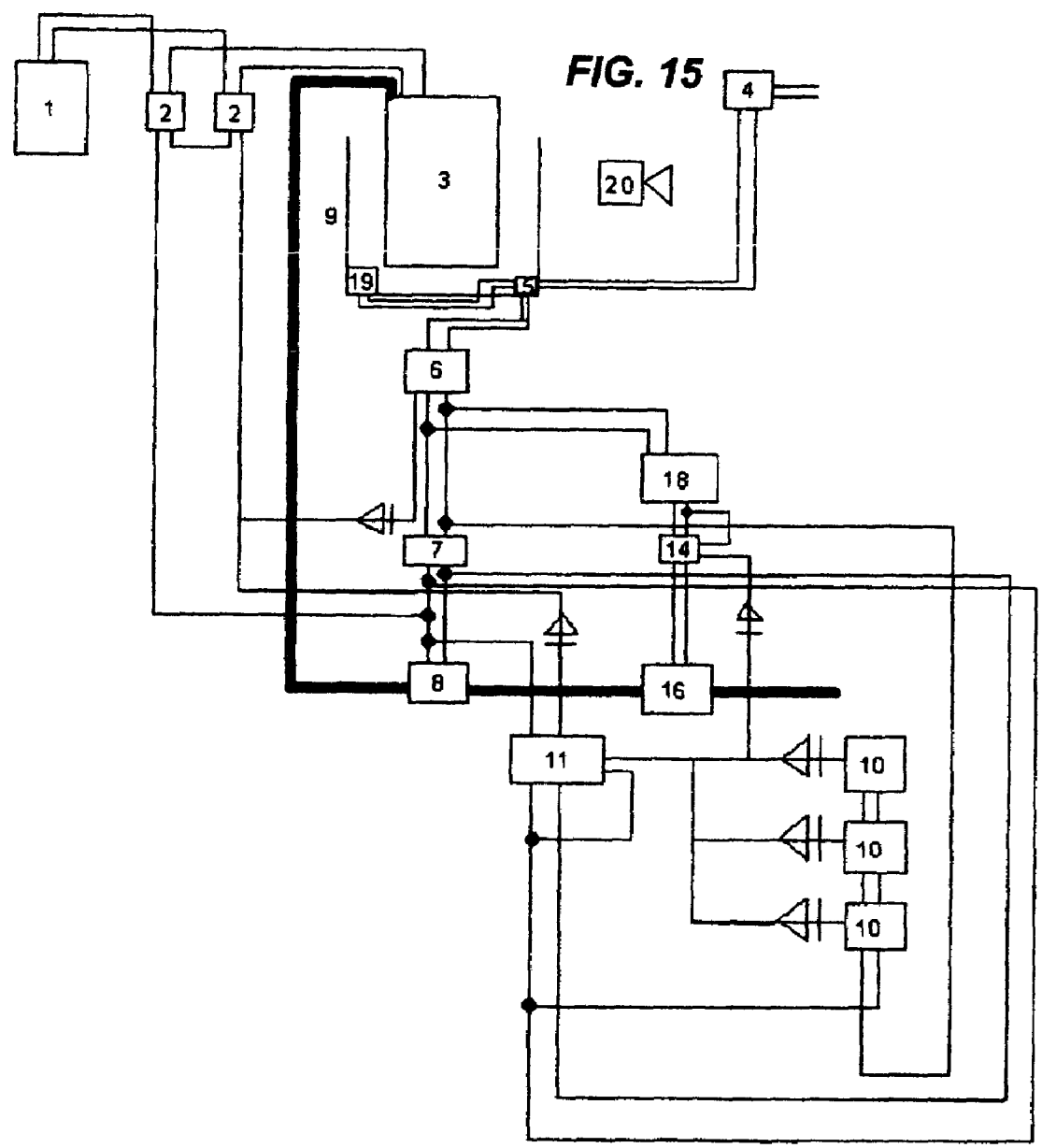
Figure 16:
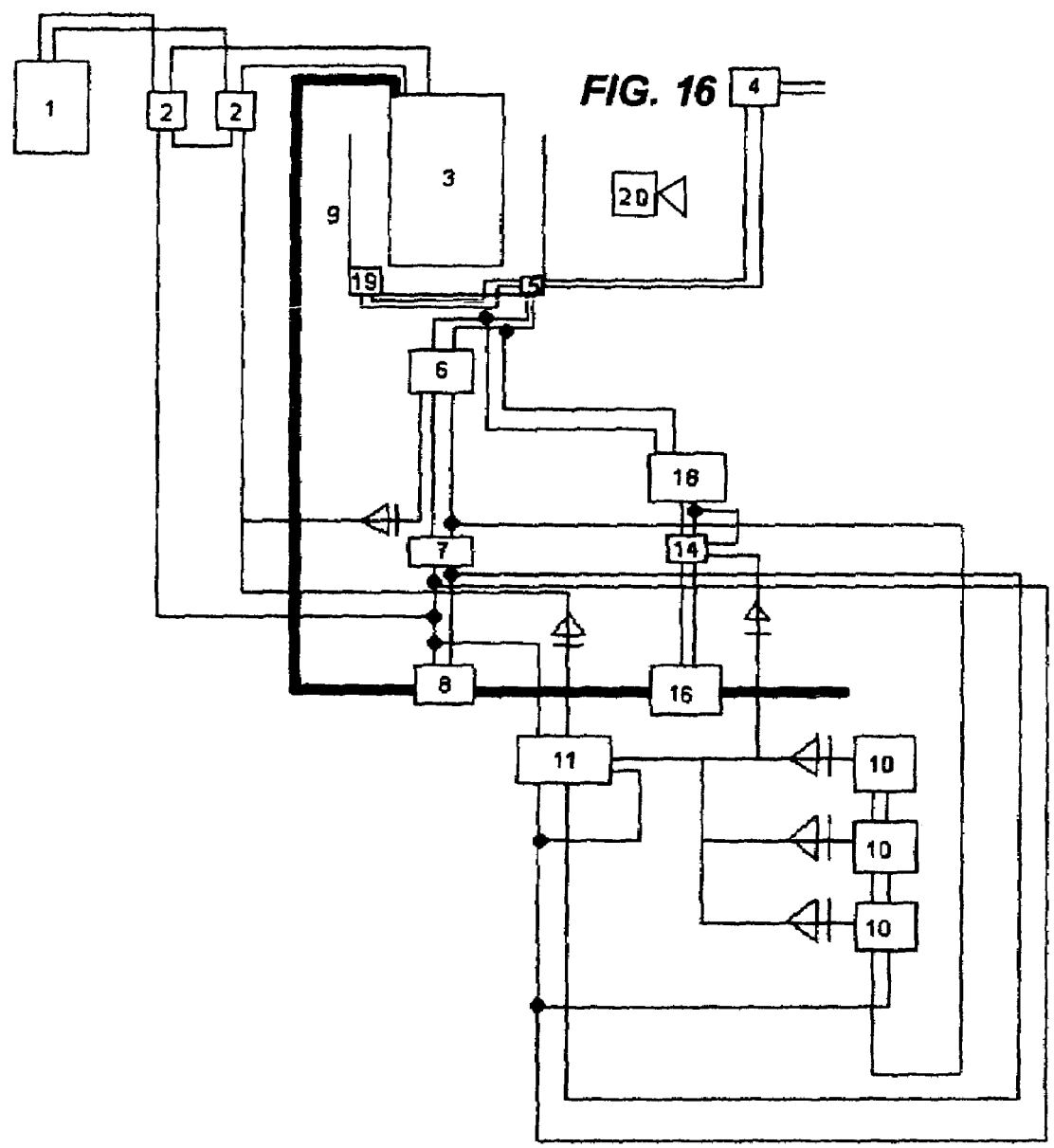
Figure 17:
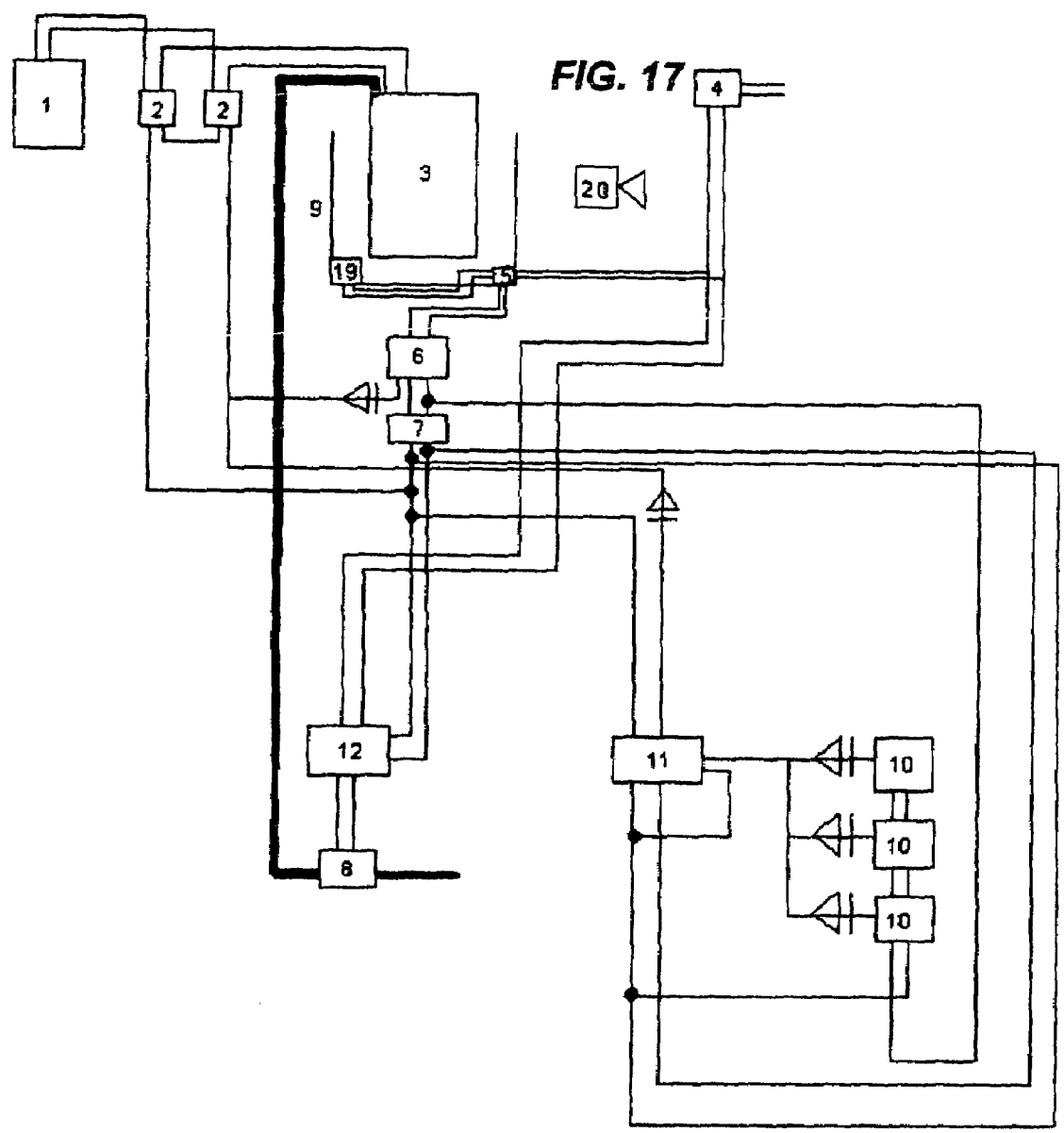

In order to provide water management functionality, a variety of components can surround the water tank (3). For the sake of simplicity, some components described in the previous figures are not shown in the circuit diagrams. A number of circuit configurations shown in FIGS. 5 to 17 are possible, wherein can be found the following components: A main circuit board (1) which is generally the house circuit board and not part of the invention per se, static relays (2) designed to receive high amperage high voltage such as those required for an electric hot water tank (3), they serve to turn the elements on or off. A manual override switch (4), a main programmable timer (6) to turn the water tank on or off according to certain schedules, a remote control receiver (7) to receive programming instructions or basic on/off instructions. Motion detectors (10) can be used on some installations to open water supply by way of an electromechanical valve (8), in which case a motion detector timer (11) sets a delay for the on activation after the signal from the motion detector (10) has ended. A water control relay (12) with a water control timer (13) shuts off water to the tank and are slave to the motion detector (10). A main water line relay (15) opens and shuts a main water line valve (16) and a main water line timer (14), both slave to the main programmable timer (6). The motion detector timer (11) can be set to override the main programmable timer (6). The main water line timer (14) can be positioned to either override the main programmable timer (6) as in FIG. 11 or be slave to it as in FIG. 10. The motion detector (10) can control both the water to the hot water tank (3) and the static relays (2) which control the heating elements or just the static relays (2). FIG. 5 shows a circuit having a static relay timer (17) which overrides the main programmable timer (6) in order to control the static relays (2). The motion detectors (10) as well as the motion detector timers (11) can be in an open loop as per FIGS. 7 to 11 or in an closed loop as per FIGS. 12 to 17. FIGS. 13 to 16 show a configuration wherein a main water valve timer (18) control the main water line valve (16). All circuits are equipped with an alarm (20) which can alert in case of a water tank leak, flood, power outage or any such problem.

The invention claimed is:

1. A water management and leak detection apparatus for a hot water tank comprising:
    a rigid secondary container to contain the hot water tank, the rigid secondary container consisting of two halves mated together around the hot water tank, the secondary container having a check valve for receiving water from outside of the secondary container and a drain for evacuating water from the secondary container;
    attachment means to attach the two halves together around the hot water tank;
    a water sensor for detecting water inside the secondary container;
    a bail pump for pumping water detected by the water sensor inside the secondary container and evacuating the water through the drain; and
    shut off means for shutting off a main water valve in response of the water sensor detecting water inside the secondary container whereby in use, the apparatus detects either water leaks originating from the hot water tank or from flood water originating from outside the water tank to thereby prevent flooding of an area in proximity of the hot water tank.

* * * * *